United States Patent
Hand

(10) Patent No.: US 7,573,235 B2
(45) Date of Patent: Aug. 11, 2009

(54) BATTERY CHARGER AND POWER REDUCTION SYSTEM AND METHOD

(75) Inventor: Evan C. Hand, Logootee, IN (US)

(73) Assignee: The Unites States of America as repsented by the Secretary of the Navy, Washington, DC (US)

( * ) Notice: Subject to any disclaimer, the term of this patent is extended or adjusted under 35 U.S.C. 154(b) by 353 days.

(21) Appl. No.: 11/239,441

(22) Filed: Sep. 26, 2005

(65) Prior Publication Data

US 2007/0069690 A1    Mar. 29, 2007

(51) Int. Cl.
*H02J 7/00* (2006.01)
(52) U.S. Cl. .................. 320/122; 320/132; 320/157
(58) Field of Classification Search ................ 320/122, 320/132, 157, 162
See application file for complete search history.

(56) References Cited

U.S. PATENT DOCUMENTS

| | | | |
|---|---|---|---|
| 3,864,617 A * | 2/1975 | Smith et al. ................. | 320/159 |
| 4,331,911 A | 5/1982 | Park | |
| 4,396,880 A * | 8/1983 | Windebank ................. | 320/156 |
| 4,494,063 A | 1/1985 | Callen et al. | |
| 5,394,075 A | 2/1995 | Ahrens et al. | |
| 5,444,378 A | 8/1995 | Rogers | |
| 5,602,459 A * | 2/1997 | Rogers ....................... | 320/138 |
| 5,696,435 A | 12/1997 | Koenck | |
| 5,747,968 A | 5/1998 | Merritt et al. | |
| 5,764,030 A | 6/1998 | Gaza | |
| 5,773,959 A | 6/1998 | Merritt et al. | |
| 5,861,733 A | 1/1999 | Yoshikawa | |
| 5,886,503 A | 3/1999 | McAndrews et al. | |
| 5,892,354 A * | 4/1999 | Nagao et al. ................. | 323/299 |
| 5,920,179 A * | 7/1999 | Pedicini ...................... | 320/122 |
| 5,932,932 A * | 8/1999 | Agatsuma et al. .......... | 307/10.6 |
| 5,998,966 A | 12/1999 | Gaza | |
| 6,002,237 A | 12/1999 | Gaza | |
| 6,043,631 A | 3/2000 | Tsenter | |
| 6,157,161 A | 12/2000 | Canter et al. | |
| 6,184,660 B1 | 2/2001 | Hatular | |
| 6,285,161 B1 * | 9/2001 | Popescu ..................... | 320/118 |

(Continued)

OTHER PUBLICATIONS

Cell-Con, Inc.; webpage: "Lithium Ion Battery Charger Li-ion Cell Con" http://www.cell-con.com/lithium-ion-charger.html; 2004; 1 page.

(Continued)

*Primary Examiner*—Jessica Han
*Assistant Examiner*—Emily Pham
(74) *Attorney, Agent, or Firm*—John Gladstone Mills; Mark O. Glut; U.S. Navy-NAVAIR Naval Air Sys Command

(57) ABSTRACT

The present invention is a shunt-type, battery-charging device that (through the use of a power dissipation and/or power reduction system and/or method) is designed to reduce the likelihood of overcharging and the possible deleterious effects (and cooling requirements) associated with the generation of heat during the charging process. Generally, the power reduction system and/or method may control the amount of power being used by the battery charger by monitoring the batteries' level of charge during charging, and by correspondingly reducing the magnitude of the charging current in response to such monitored level.

3 Claims, 7 Drawing Sheets

U.S. PATENT DOCUMENTS

| | | | |
|---|---|---|---|
| 6,300,763 B1 * | 10/2001 | Kwok | 324/427 |
| 6,329,792 B1 * | 12/2001 | Dunn et al. | 320/132 |
| 6,351,110 B1 | 2/2002 | Pappalardo et al. | |
| 6,388,424 B1 | 5/2002 | Hidaka et al. | |
| 6,400,124 B1 | 6/2002 | Hidaka et al. | |
| 6,417,646 B1 | 7/2002 | Huykman et al. | |
| 6,476,583 B2 | 11/2002 | McAndrews | |
| 6,518,726 B1 | 2/2003 | Nowlin, Jr. et al. | |
| 6,583,603 B1 | 6/2003 | Baldwin | |
| 6,586,913 B2 | 7/2003 | Rolfes | |
| 6,664,765 B2 | 12/2003 | Dotzler et al. | |
| 6,791,297 B2 * | 9/2004 | Ott et al. | 320/116 |
| 6,822,423 B2 | 11/2004 | Yau et al. | |
| 6,917,182 B2 * | 7/2005 | Burton et al. | 320/108 |
| 7,378,818 B2 * | 5/2008 | Fowler et al. | 320/119 |

OTHER PUBLICATIONS

Cell-Con, Inc.; webpage: "Lithium Ion Smart Chargers by Cell-Con" http://www.cell-con.com/productsheets/li.html; Aug. 5, 2003; 2 pages.

Cell-Con, Inc.; webpage: "Lithium Ion Smart Battery Charger 1.3A by Cell-Con" http://www.cell-con.com/productsheets/standard/li1-3a.html; May 4, 2005; 3 pages.

Cell-Con, Inc.; webpage: "Lithium Ion Smart Battery Charger 2.3A by Cell-Con" http://www.cell-con.com/productsheets/standard/li2-3a.html; May 4, 2005; 2 pages.

Cell-Con, Inc.; webpage: "Lithium Ion Smart Battery Charger 4A by Cell-Con" http://www.cell-con.com/productsheets/standard/li4a.html; May 4, 2005; 2 pages.

* cited by examiner

Begin

Set Initial Charging Current Value

While Charging
    Reset Current Channel Counter
    Reset Current Bypass Counter
    Read and Save Individual Bypass Currents(n)

Do Power Management
      Set Current Channel Counter *(to number of current channels)

For: n = 1 to Current Channel Counter:
        If Bypass Current(n) above threshold current *(e.g., 0.01A--noise):
          Read Current Bypass Counter *(count number of current channels bypassing)
          Save Lowest Bypass Current End If
      End For If Current Bypass Counter equals Current Channel Counter
        Then Down Program Current Source *(by a % of the Lowest Bypass Current value)
      End If
    End Do Power Management
  End While End

Begin:

LastOutput = 25

Do Convert Amps to Matrix Control:
　NewOutput = (LastOutput - LowestBypassCurrent)

SwitchOutput = INT(NewOutput/NumberOfSolarArrays) + 1
　Convert SwitchOutput to BitPattern Set [SwitchOutput] to BitPattern
　LastOutput = SwitchOutput * 5

End Do

End:

BATTERY CHARGER AND POWER REDUCTION SYSTEM AND METHOD

STATEMENT REGARDING FEDERALLY SPONSORED RESEARCH OR DEVELOPMENT: STATEMENT REGARDING FEDERALLY SPONSORED RESEARCH OR DEVELOPMENT

The invention described herein may be manufactured and used by or for the Government of the United States of America for governmental purposes without payment of any royalties thereon or therefor.

CROSS REFERENCE TO RELATED APPLICATIONS

Not Applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

The present invention generally relates to an apparatus, and system and/or method capable of charging (or recharging) batteries, and more particularly, but without limitation, to an apparatus, and system and/or method that may be capable of minimizing its power dissipation requirements by adjusting the magnitude of the charging current being sent to the batteries being charged—based, in part, on each battery's level of charge.

Generally, rechargeable batteries are available in a variety of chemical configurations including the "old standard" lead-based, car batteries, and the "newer" nickel cadmium, nickel metal hydride and "lithium" rechargeables. Furthermore, because rechargeable batteries may be able to provide cost savings (by eliminating the need to purchase a new battery each time an old battery becomes depleted) these batteries are being produced in a variety of shapes and sizes, and for use in a growing number of applications.

Consequently, differing types of battery chargers have been developed, and many of these are well known in the prior art including low charge-rate, timed, and rapid chargers. While many of these chargers are generally adequate, charging problems may still arise due to various design constraints. As examples, the low charge-rate charger may take an inconvenient amount of time to complete its task; the timed charger may complete its "timed charging cycle" before the batteries that are being charged are actually fully charged; and the rapid charger may overcharge and possibly ruin a battery. Regarding this, and as an example, rechargeable lithium-ion batteries are intolerant to overcharge conditions, and may experience early cycle life failures. This overcharging problem is heightened in applications that are configured to charge multiple series-connected batteries from a common charging source. In such configurations, some of the batteries being charged may become fully charged earlier then others, which may subject these batteries to an overcharge condition that could shorten their cycle life. However, because it is usually less expensive to charge multiple batteries from a single source than it is to provide a separate charge source for each individual battery being charged, a common charge source may be preferable.

In response, new technologies are emerging, and one such technology uses shunt style charging circuits to clamp the charging voltage of each series connected battery to a "precise" predetermined voltage setting. Generally, these charging circuits shunt excess current around each series connected battery while essentially holding each battery's voltage constant at some predetermined voltage level. A benefit of using shunt regulators is that they are inexpensive to build and are able to achieve precise charge voltage levels. On the other hand, however, they are very inefficient in operation because of the large amounts of power that they dissipate during the shunting action. Moreover, while shunt regulators are usually designed to dissipate full power for extended periods-of-time, the use of these higher power levels may shorten the lifetime of any associated electronic circuitry and may require the addition of some form of supplemental cooling.

Therefore, a need exists for the development of an efficient, shunt-type battery-charging device that is designed to reduce the likelihood of overcharging and the possible deleterious effects (and cooling requirements) associated with the generation of heat during the charging process.

SUMMARY OF THE INVENTION

According to its major aspects and briefly recited, the present invention (without limitation) generally relates to devices and methods for charging, keeping charged, and/or recharging, rechargeable batteries including, but not limited to, rechargeable lithium-ion batteries.

More specifically, the present invention is a battery charger that incorporates a useful and improved shunt-style charging system and/or method, which is capable of possibly alleviating some (if not all) of the above-mentioned problems. Generally, as an example but not as a limitation, the present invention battery charger and shunt charging method may be comprised of readily available and well-known electronic (and/or electrical) components (and/or devices), which may be incorporated into (or on) a base element (or structure). In this regard, different base elements could be selected in order to provide functional flexibility and, possibly, portability. For example, the base element could be designed to handle the charging of a single battery and/or the charging of a multiple number of batteries simultaneously. Moreover, it may be designed to be capable of handling different battery sizes. Furthermore, the battery charger may preferably use a common charging source, and may use commonly available hardware and/or software solutions including, but not limited to, the use of one or more solar cells or solar arrays, any of which may assist in achieving its purpose, and, possibly, allow for the present invention's use in (or on) satellites, spacecraft or other space-based platforms as well.

A feature of the present invention is that it uses a common charging source and shunt style charging circuits to regulate the charging process, which may provide the advantage of allowing the battery charger to effectively charge batteries at a lower cost.

Through the present invention's use of hardware and software, another feature of the present invention is that it possibly minimizes the amount of power needed for charging purposes. This possibly provides the following advantages: an increase in efficiency; a reduction in the likelihood of overcharging conditions; and a reduction in the generation of heat.

Another advantage of lower power use (and the consequent generation of heat) is the possible elimination of the need for supplemental cooling, which possibly provides an additional advantage of being capable of lower manufacturing costs, e.g., lower production costs, and may decrease the deleterious effects that such heat may have on the battery charger (e.g., its component parts).

Still another feature of the battery charger is that it may use readily available components; however, it is not limited to these components. An advantage of this is that the battery charger could have the flexibility to be configured for standard sizes/shapes (and for standard full-charge voltage-levels), or it could be easily configured to meet other standards and/or requirements (and/or to use other components as they are developed).

It is a further feature of the present invention to be functionally and operationally simple to use, yet be highly durable and reliable.

Other features and their advantages will be apparent to those skilled in the art from a careful reading of the Detailed Description of the Invention, accompanied by the drawings.

BRIEF DESCRIPTION OF THE DRAWINGS

FIG. 4A is an example of software code usable for the charging process shown in FIGS. 3A and 3B according to an embodiment of the present invention; and FIG. 4B is an example of an alternate software code usable with at least the Battery Charger embodiment shown in FIG. 1B.

DETAILED DESCRIPTION OF THE INVENTION

The devices, circuits, and/or other components described below preferably come from a group of devices, circuits, and/or other components that are well known and/or are commonly available to (or may be fabricated using commonly available knowledge, methods, and/or technology in) the field(s) of electronics or electrical equipment design, and/or to other related fields. And, while the use of these may be preferable, other means of implementing the present invention may also be used as well.

Figure 1A:
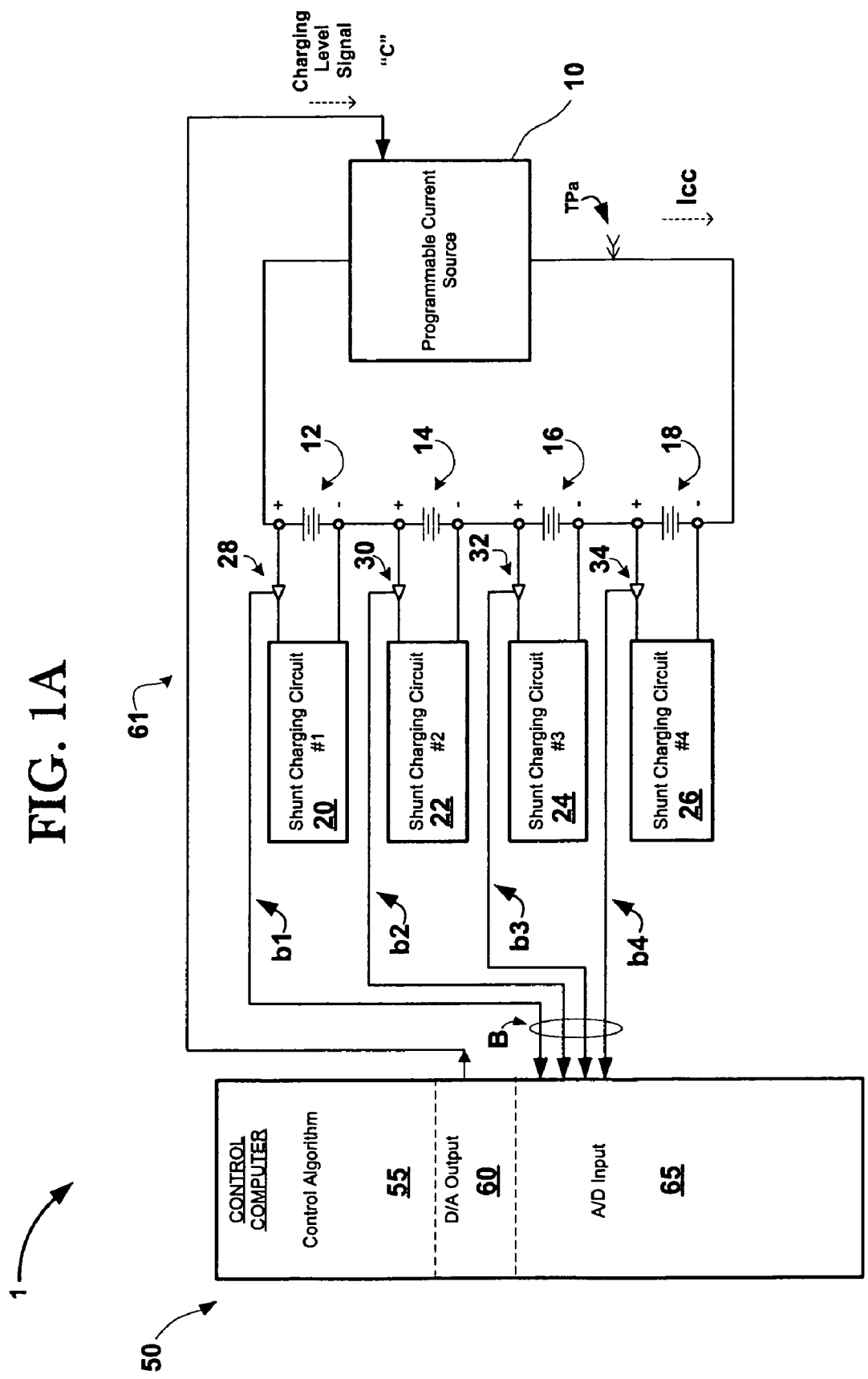
FIG. 1A is a schematic block diagram of a Battery Charger according to an embodiment of the present invention.

Referring now to FIG. 1A, a schematic block diagram of an embodiment of the present invention Battery Charger (BC) 1 is shown. As shown, a Programmable Current Source 10 is electrically connected across, and is representationally being used to charge four batteries, which have been removably inserted into battery charging slots 12, 14, 16 and 18. Each battery charging slot 12, 14, 16 and 18 is a part of an associated Shunt Charging Circuit, and, as shown, charging slot 12 is associated with Shunt Charging Circuit #1 (20); charging slot 14 with Shunt Charging Circuit #2 (22); charging slot 16 with Shunt Charging Circuit #3 (24); and charging slot 18 with Shunt Charging Circuit #4 (26). Generally described, a battery charging slot 12, 14, 16 or 18 can be any appropriate, well-known means for operationally connecting a battery to an electrical and/or electronic circuit. Generally described, these Shunt Charging Circuits 20, 22, 24 and 26 are "shunt-style" charging regulators, and each Shunt Charging Circuit 20, 22, 24 and 26 preferably derives all of its operating power from the battery that it is regulating; however, other internal or external power sources or supplies including, but not limited to, the Programmable Current Source 10 could be used as well. Consequently, each Shunt Charging Circuit 20, 22, 24 and 26 may preferably operate independently of each other.

Preferably, each Shunt Charging Circuit 20, 22, 24 and 26 will have its own internal voltage comparator (not shown), and will be in electrical communication with the Current Sensors 28, 30, 32 and 34, as shown. The Current Sensors 28, 30, 32 and 34 are preferably precision resistances; however, op-amp circuits or other suitable devices, methods, or means can be used as well. These Current Sensors 28, 30, 32 and 34 are preferably used to provide a means to "measure" the individual bypass currents associated with the shunt charging circuits and to transmit signals representative of such bypass currents, which, at least, may be used for (or with) the power reduction/battery charging process described below. Additionally, as shown in FIG. 1A, these signals are represented by the Individual Bypass Current signals b1, b2, b3 and b4 and a Total Bypass Current signal B, which are transmitted to the A/D Input Device 65 for further processing.

Still referring to FIG. 1A, the Control Computer 50 is preferably used to manage the operation of the Battery Charger 1, and preferably includes at least one "processor" or "CPU" for implementing a Control Algorithm 55—for monitoring and controlling the power reduction/battery charging process, or at least assisting in such monitoring and control. (Hereinafter a "processor" or a "CPU" may be referred to as a "computing device", and any of these descriptors may be used interchangeably, as appropriate.) In general, any processor, CPU, or computing device used in the BC 1 may come from a group of devices that includes, but is not limited to: a "Field Programmable Gate Array" (FPGA); a "microprocessor," which is basically an entire CPU on a single chip and commonly referred to as a "microprocessor unit," and, if used with a power supply, memory and a clock, it would function like a computer; a "microcontroller," which is also known as a "computer on a chip," and is generally defined as: a single chip that contains the processor, RAM, ROM, clock and the I/O control unit; a "PLA" ("Programmable Logic Array"), or an "ASIC" ("Application Specific Integrated Circuit"), which is a chip that is custom designed for a specific application rather than a general-purpose chip such as a microprocessor; an "embedded system" which is basically a specialized computer for use in a specialized application and which may either use an embedded Operating System or have the Operating System and the specialized application combined into a single program; and/or a "Digital Signal Processor," which is a programmable CPU that is used for making analog to digital and/or digital to analog conversions and that may include fast instructions sequences commonly used in such conversion applications. Moreover, the Control Computer 50 preferably uses (or is in communications with) an analog-to-digital (AID) Input Device 65 for reading and processing analog signals, a digital-to-analog (D/A) Output Device 60 for, among other functions, providing signals for use in controlling the Programmable Current Source 10, and, as previously mentioned, the Control Algorithm 55.

Figure 3A:
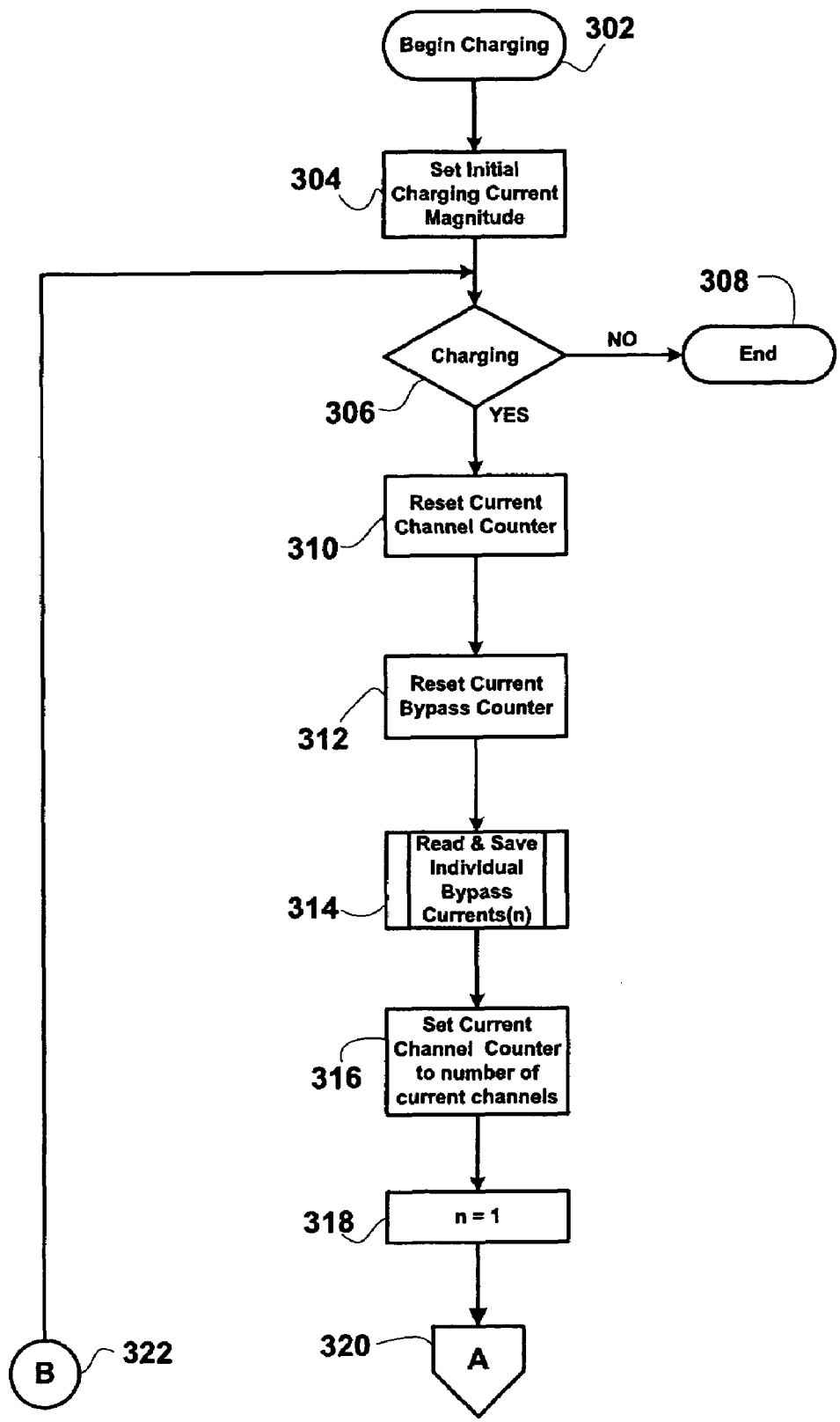
FIGS. 3A and 3B is a flow chart illustrating the charging process of the Battery Charger according to an embodiment of the present invention.
Figure 3B:
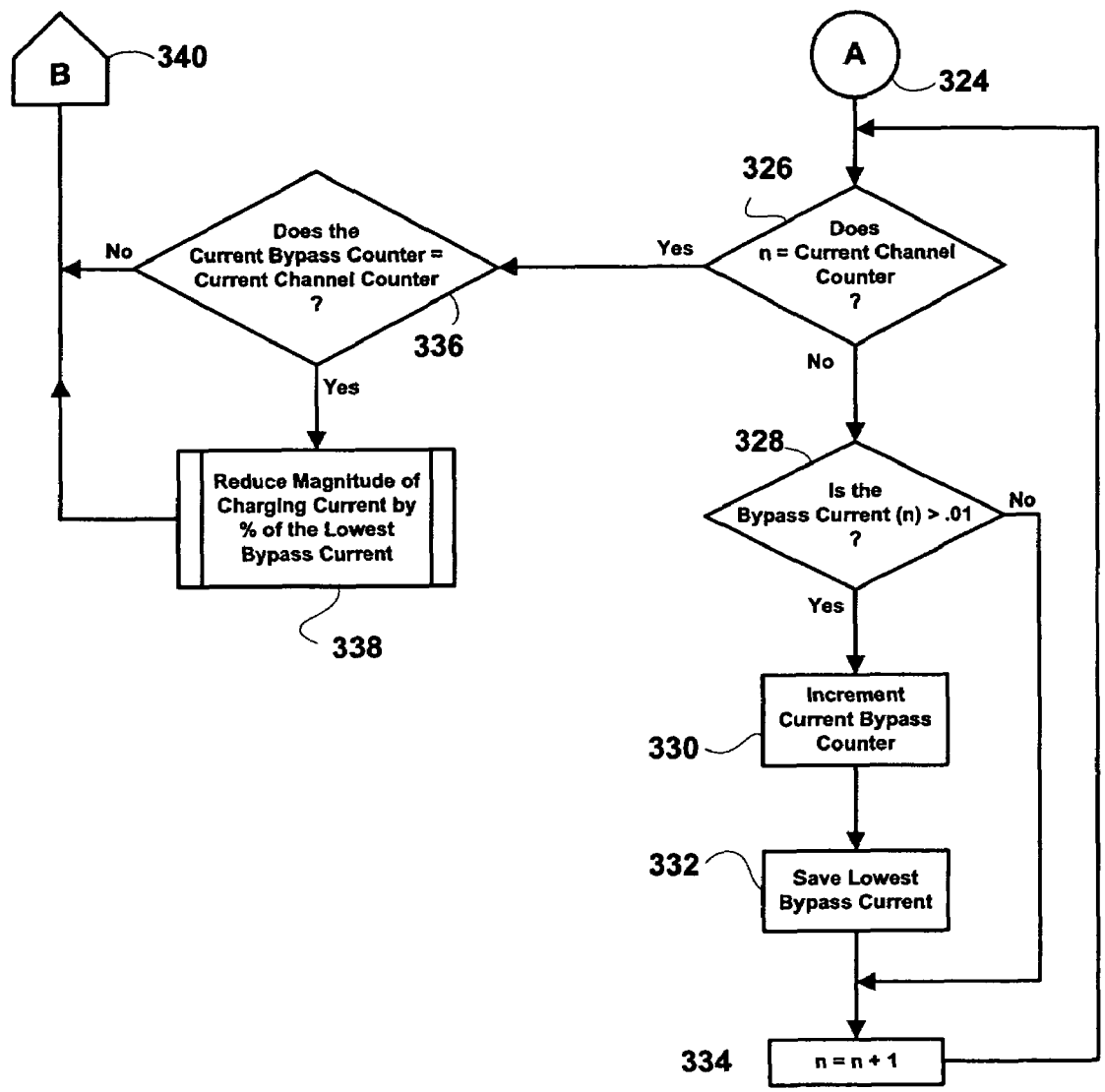

More specifically, the A/D Input Device 65 preferably refers to any device and/or method that may be used to convert analog signals into digital data for computation and/or storage including, but not limited to, such devices as a model E1411B, 5.5 digit, digital multi-meter from Agilent Technologies (which has a business address of: 395 Page Mill Road, P.O. Box 10395, Palo Alto, Calif. 94303). Furthermore, the D/A Output Device 60 preferably refers to any device or method that may be used to program and/or control the operation of the Programmable Current Source 10 including, but not limited to, such devices as a model E1328A, 4-channel digital-to-analog converter (also from Agilent Technologies), and the Programmable Current Source 10 preferably refers to any device and/or method that may be used to supply the charging current needed to recharge the battery cells including, but not limited to, such devices as a model XHR 20-50 power supply from Xantrex (which has a business address of: 195$^{th}$ Street, Arlington, Wash. 98223). Moreover, the Control Algorithm 55 refers to computer code, instructions, and/or any other method that can be used to control at least a portion of the power reduction function and/or charging process of the BC 1 including, but not limited to, the possible use of the Charging Process (300A and/or 300B) shown in FIGS. 3A and 3B, and/or the software code 400 as shown in FIG. 4A. However, it should be noted that other suitable algorithms and/or sets of coded instructions, other programming and/or software, and/or other hardware configurations, which may (or may not) be virtual implementations of software, could be used as well.

While referring to FIGS. 1A, 3A and 3B, and 4A, the description following the background information is a non-limiting example of one of the possible operational uses of the present invention. As background, a usable charging current is generally dependant upon battery size, and, typically, the battery-charging rate is referred to as a "C" or a Capacity rate. Furthermore, the simplest method for determining a battery-charging rate, or the "C" rate, is usually derived using the desired charging time, and, as an example, if the desired minimum charging time is 3-hours then the charging rate is defined as C/3 where the value of "C" is the capacity of the battery. More specifically, the charging rate of a 50-ampere battery for a three-hour charge time can be calculated by dividing 50 (amperes) by 3 (hours), i.e., 50÷3=16.67 amperes, and therefore, the "initial charge-current value" of the Control Algorithm should be set to 16.67 amperes for this example. [Generally, however, it should be noted that, at a minimum, the ability to successfully charge a battery (such as the one described in the above example) requires that the battery be capable of accepting the designated charge rate (i.e., 16.67 amps/hr), and can be fully charged in three hours.] Continuing with the background, when a "constant potential" charging method or system is used (e.g., when using a shunt-charger circuit), lower charging current levels are required to maintain the "constant potential" as the battery's "State of Charge" (SOC) approaches 100%. Consequently, in order to maintain the required "charge potential," a shunt-charger typically "bypasses" excess current, and, as the SOC increases, the shunt-charger generally needs to bypass more current, which is generally wasted as heat. Because of this, a significant benefit can be gained by using the present invention's power reduction system and/or process as described herein.

The following is one non-limiting example of the operation of the present invention. Either before or after energizing the Battery Charger (BC) 1, one or more rechargeable batteries may be inserted (observing proper polarity requirements) into the battery charging slots 12, 14, 16 and 18. More specifically, for this example, one battery is inserted into each of these charging slots 12, 14, 16 and 18. If, on the other hand, not all of charging slots 12, 14, 16 and 18 are occupied with a battery to be charged, then each of the unoccupied slots can be "jumpered out" or bypassed to retain series circuit continuity. As a non-limiting example, the "jumpering out" may be accomplished by the manual insertion of physical "jumpers" (having the appropriate electrical characteristics to perform this function); however, the "jumpering out" or bypassing of the unoccupied slots 12, 14, 16 and 18 may also be accomplished by either manually or automatically switching in an electrical, electronic, or other appropriate "bypass circuit" as well. Continuing, each used Shunt Charging Circuit 20, 22, 24 and 26 will come on-line, sense the voltage of the associated battery, set (or have set by the Control Computer 50) the voltage-limiting value (or, as an alternative, have this value manually set or preset), and may transmit a bypass current signal to the A/D Input Device 65 of the Control Computer 50 (preferably via the associated Current Sensor 28, 30, 32 or 34). Relatedly, the A/D Input Device 65 reads each appropriate bypass current signal b1, b2, b3 and/or b4 received, and then saves these readings for further processing of these signals.

The Control Algorithm 55 may process the signals received by the Control Computer 50, and as a non-limiting example may perform the following operations: (1) transmit a Charging Level Signal C (via the D/A Output Device 60) to the Programmable Current Source 10 to set the initial magnitude of the Charging Current Icc from the Programmable Current Source 10; and while charging (2) read and save the Individual Bypass Currents b1, b2, b3 and/or b4, and transmit a new Charging Level Signal C to the Programmable Current Source 10 in order to change the charging current, if (and when) appropriate. Preferably, the Charging Level Signal C used to set the initial Charging Current Icc value is pre-programmed into the Control Computer 50, and both C and Icc are preferably based on the characteristics of the batteries and/or the BC 1. Furthermore, the value of each Charging Level Signal C used to change (or reduce) the magnitude of the Charging Current Icc are preferably based on (or are a pre-programmed function of) a percentage of the lowest value of the Individual Bypass Currents b1, b2, b3 and/or b4, which are stored or are being processed by the Control Computer 50, and each Charging Level Signal C is preferably pre-programmed as well. In one embodiment of the present invention, the magnitude of the Charging Current Icc will remain at the rated charging level of the BC 1 until all of the charging batteries reach their voltage-limiting level. Afterward, the charging current will be adjusted toward the minimum rated Charging Current Icc level for the BC 1—preferably until the minimum level is attained, the battery is removed, and/or the BC 1 is de-energized.

While an implementation of the BC 1 has been described above, referring now to FIGS. 1, 3A and 3B, a non-limiting example of a flowchart illustrating the Control Algorithm 55 and/or the power reduction/battery charging process 300A and 300B (Process) is shown. The Control Algorithm 55 and/or the Process 300A and 300B (hereinafter either descriptor may be used interchangeably, as appropriate) may begin by energizing the BC 1 (as depicted by the "Begin Charging" block 302), and by setting the initial charging current value (as represented by the "Set Initial Charging Current Magnitude" block 304). Next, a determination of the operational state of the BC 1 is made, as shown by the "Charging" block 306. A negative determination 308 terminates the process 300A and 300B while a positive determination of the BC 1 being energized/operating causes the BC 1 to reset two counters—as shown by the Reset Current Channel Counter block 310 and the Reset Current Bypass Counter block 312, respectively. The Control Computer 50 then: determines and stores the number and the magnitudes of the Individual Bypass Currents b1, b2, b3 and/or b4 (as represented by the "Read & Save Individual Bypass Currents(n)" block 314; determines the number of Current Channels being used, as depicted by the "Set Current Channel Counter to number of current channels" block 316; and sets a "counter" to 1, as shown by the "n=1" block 318. The Control Algorithm 55 (and/or the Control Computer 50) continues by determining whether the "n" counter value equals the Current Channel Counter value (as depicted by the "Does n=Current Channel Counter?" shape 326), and, if a negative determination is made, the Process 300A and 300B determines whether the magnitudes of the Bypass Currents exceed a preset (but preferably adjustable) electrical "noise" level (as shown by the "Is the Bypass Current(n)>0.01?" shape 328). If the magnitude of any of the Bypass Currents is below the "noise" threshold, the Process 300A and 300B increments the "n" counter, as represented by the "n=n+1" block 334, and loops back to the "Does n=Current Channel Counter?" shape 326, and relatedly, if the magnitudes of the Bypass Currents are above the "noise" threshold then the Process 300A and 300B proceeds by Incrementing the Current Bypass Counter, as represented by the "Increment Current Bypass Counter" block 330 and saving the lowest Bypass Current magnitude, as represented by the "Save Lowest Bypass Current" block 332 before incrementing the "n" counter 334 and looping back to the "Does n=Current Channel Counter?" determination 326. If, during any pass to the "Does n=Current Channel Counter?" determination 326, the result is positive, then the Process 300A and 300B proceeds by making a determination as to whether the values stored in the Current Bypass Counter and the Current Channel counters are equal (as represented by the "Does the Current Bypass Counter=Current Channel Counter?" shape 336). If these counters are equal, then the magnitude of the charging current is reduced by a percentage of the lowest Bypass Current value (i.e., the lowest value of the Individual Bypass Currents b1, b2, b3 and b4 stored in the Control Computer 50), as represented by the "Reduce Magnitude of Charging Current by % of the Lowest Bypass Current" block 338. If the counters are not equal, or if the charging current has been reduced, the Process 300A and 300B and/or the Control Algorithm 55 preferably proceeds by looping back to the initial Charging determination 306 for another pass through at least a portion of the Process 300A and 300B and/or the Control Algorithm 55.

Figure 2A:
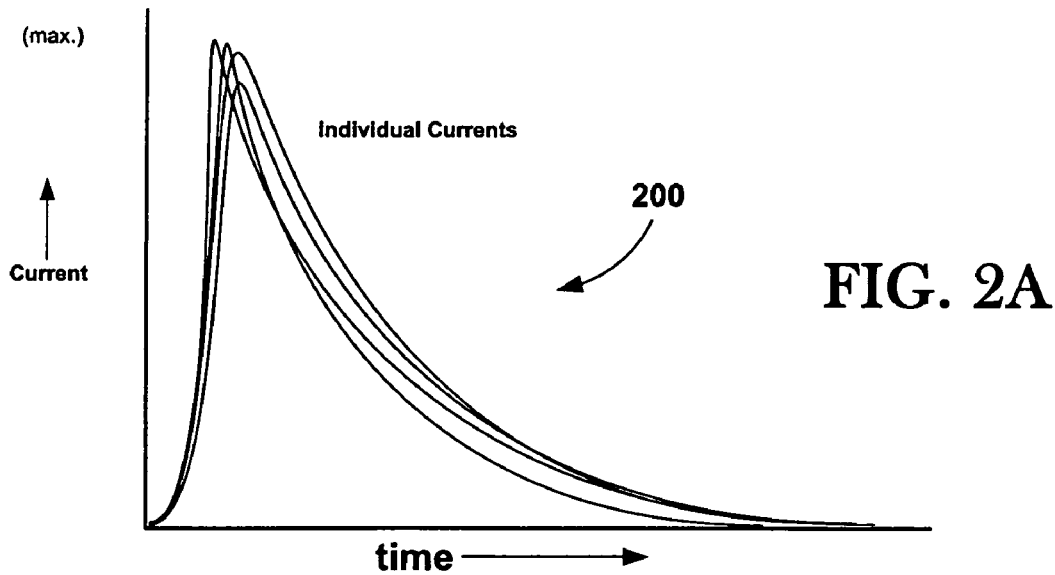
FIG. 2A is a graphical representation of an example of the possible individual bypass currents obtained during charging as a function of time according to an embodiment of the present invention.
Figure 2B:
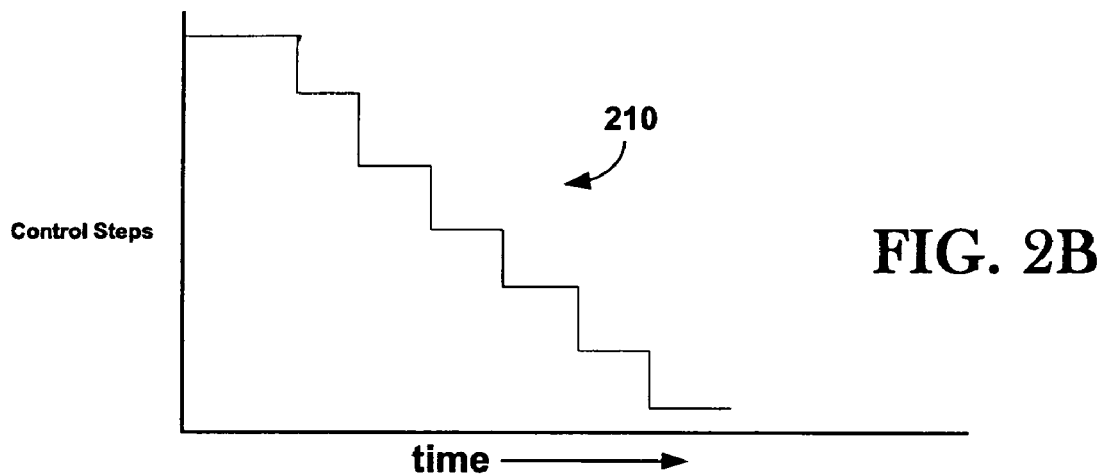
FIG. 2B is a graphical representation of an example of power reduction "signal steps" transmitted to the programmable current source as a function of time during the charging process according to an embodiment of the present invention.
Figure 2C:
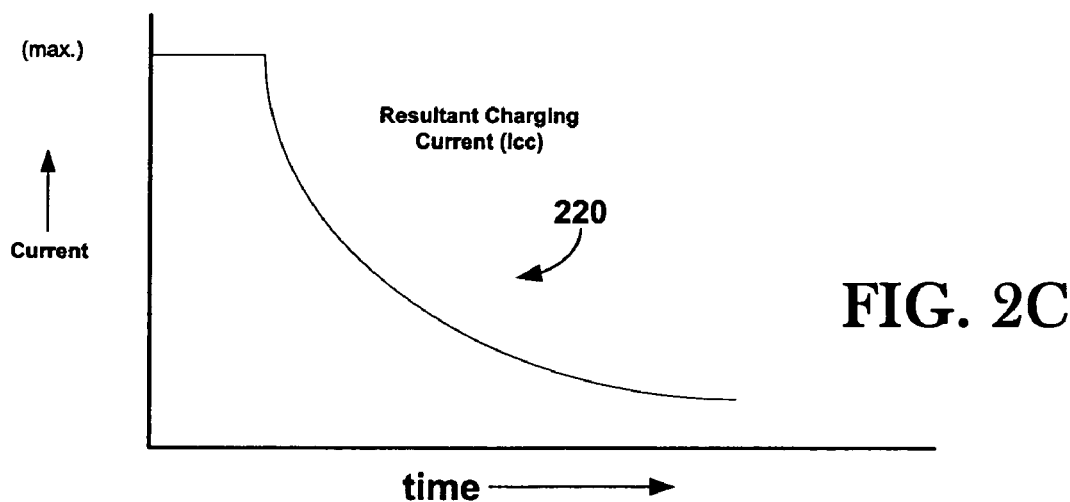
FIG. 2C is a graphical representation of an example of the possible charging current flow as a function of time according to an embodiment of the present invention.

In other words, the result of the Control Computer 50 analysis of the signals processed may cause the Process 300A and 300B and/or the Control Algorithm 55 to transmit at least one "Charging Level Signal" C over an output line 61 to the Programmable Current Source 10 in order to change the level of the Charging Current Icc (as shown in FIG. 1A). In other words and in general, during charging, the "Charging Level Signal" C sent to the Programmable Current Source 10 is preferably used to cause an appropriate adjustment to the level or magnitude of the Charging Current Icc, and, as an example, the change to the level of the Charging Current Icc may be a reduction in such level. However, depending on the magnitude of the Individual Bypass Currents b1, b2, b3 and/or b4 processed by the Control Computer 50, the Charging Current Icc may remain unchanged, or may be increased or decreased as well. Related to these discussions, a non-limiting example of the pseudo-code 400 that may be used with the Control Algorithm 55 is shown in FIG. 4A. In addition, non-limiting graphical examples of possible changes (over time) in the Charging Current Icc (which is represented as the Resultant Charging Current 220 in FIG. 2C), the Individual Bypass Currents b1, b2, b3 and/or b4 (shown as the Individual Currents 200 in FIG. 2A), and the Charging Level Signal(s) C transmitted via the output line 61 (shown as the Control Steps 210 in FIG. 2B), are shown.

The following non-limiting example is a description of an operational test of the BC 1 and Process 300A and 300B (which is based on performing battery life-cycle testing). In the embodiment of the present invention used for this example, the BC 1, as shown in FIG. 1A, is comprised of four shunt charger circuits 20, 22, 24, and 26 and, in this example, four batteries are preferably inserted 12, 14, 16, and 18 and charged simultaneously. During operation, as described, it is very unlikely that all four battery and charging circuits are identical, which might result in variations as to the moment during which each circuit will start to bypass current b1, b2, b3, and/or b4 through the Current Sensors 28, 30, 32, and 34. As an example, this time variance has been observed to be between about 3 to 5 minutes. Referring now to the Control Algorithm 55 and the Code 400 shown in FIG. 4A, there are two variables that allow the Control Algorithm 55 to determine when all active current channels are bypassing: (1) the Current Channel Counter, which will record the number of active current channels—in this example, this number will be 1 through 4; and the Current Bypass Counter, which records how many Current Channels are actually in the process of bypassing (1 to the value of {Current Channel Counter}). Using these variables (i.e., the Current Channel Counter and the Counter Bypass Counter) as triggers, the inventive Process 300A and 300B (including the "Down Programming") in this example will not become operational until these two values are equal. When this occurs the "Down Programming" will begin to decrease the Charging Current Icc as described by the Code 400. [As an aside: The number of current channels (and the value of the Current Channel Counter) would decrease by the number of batteries (cells) removed from the circuit if some of the batteries were removed, for example, if four batteries are being charged in a life-cycle test experiment, and if one failed and was physically removed from the BC 1, then the number of Current Channels and the value of the {Current Channel Counter} would equal three.]

Continuing, to prevent premature "Down Programming," i.e., reducing the charging current, the present invention essentially filters out system noise by requiring that each bypass current b1, b2, b3, and/or b4 (sensed by the A/D Input device 65) exceeds 0.01 amps prior to reducing the Charging Current (shown as Icc in FIG. 1A) via "Down Programming." The "Down Programming" Code 400 has other features that set the present invention apart from other shunt chargers. For example, other shunt chargers may be limited by constraints imposed by the size, temperature and/or the charging rate of the battery or batteries being charged while, by using well known or readily producible hardware and/or code including the Improved Battery Charger Power Reduction Algorithm Pseudo Code 400, the "Power Management/Power Reduction System and Process 300A and 300B" of the present invention is not. Preferably, the "While Charging" construct (as shown in the Code 400) will execute while (or when) all conditions are favorable for charging operations. During operations in the test lab, all four batteries and currents are sensed, and the generated data is operated upon every 15 to 30 seconds. However, it should be understood that such time results are dependant upon testing requirements and/or goals. In other words, the Pseudo Code 400 will preferably execute the "While Charging" construct every 15 to 30 seconds, but is not limited to this execution frequency.

Figure 1B:
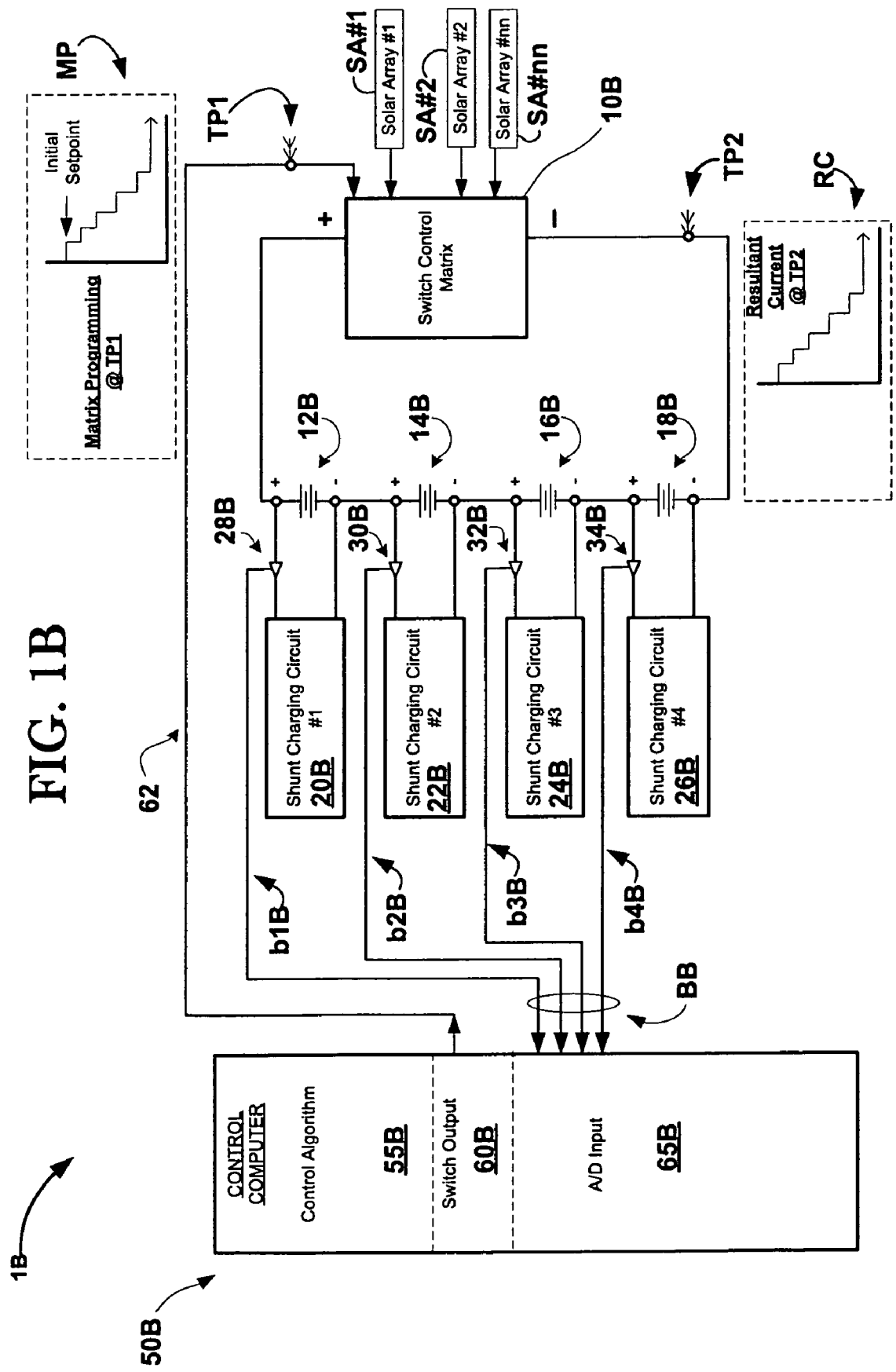
FIG. 1B is a schematic block diagram of a Battery Charger according to another embodiment of the present invention

Referring now to FIGS. 1B and 4B, another improved Shunt Charger Power Dissipation and/or Power Reduction System 1B and Method 500 using an alternative current source is described. While most of the operability and functionality of this embodiment have been previously described above, the primary differences for this embodiment are disclosed by the following discussion of another non-limiting example. The Switch Control Matrix 10B is preferably a simple series of electrically actuated switch (or switching) devices (e.g., relays) that the Control Computer 50B could control by the Switch Output line 62. The device used for the Switch Output Controller/Function 60B would preferably be a digital output circuit card, which would be used to control the switching devices of the Switch Control Matrix 10B. For a simple example of the operation of this embodiment, assume that each Solar Array SA#1, SA#2, through SA#nn is being used (with #nn=5 so that a total of Five (5) Solar Arrays are being used), and that each Solar Array SA#1, SA#2, through SA#5 could provide a 5-amperes charge current. This would potentially provide a maximum of 25-amperes of charging current, and, for this example, would require adjusting the current source in 5-ampere increments. Consequently, the power reduction of the Solar Array Algorithm 500 is modified so that it could control the current in these 5-ampere increments. Therefore, the Switch Control Matrix 10B could only affect a change after (or when) the lowest bypass current rises above 5-amperes. Continuing with this example, if five individual control lines (not shown) are used for (or are part of) the Switch Output Controller/Function 60B of the Control Computer 50B, and each is assigned a "weight" of 5-amperes each, then controlling the Solar Arrays SA#1, SA#2, through SA#5 via the Switch Control Matrix 10B becomes rather simple, i.e., each time one of the Switch Output lines is closed or opened, the available charging current RC (which is preferably measurable at TP2) would be adjusted up or down by 5-amperes as appropriate. The Solar Array Algorithm 500 shown in FIG. 4B can easily affect this control. In this Algorithm 500 the following is assumed: (a) the maximum output current is twenty-five (25) amperes; (b) the number of solar arrays is five (5); (c) each solar array provides five (5) amperes of charging current; and (d) each bit of the Bit Pattern can control five (5) amps of charging current. If the LowestBypassCurrent is 3-amperes then: (a) NewOutput=(25−3)=22 amperes; (b) SwitchOutput=(INT(22/5)+1)=5; (c) BitPattern="11111"; and (d) LastOutput=(5*5)=25. In this case, the Bit Pattern "11111" would cause five switching devices to energize and thus provide the full twenty-five (25)-amperes of charging current, i.e., each "1" represents five (5)-amperes; therefore, since there are five "1s" then the charging current would be twenty-five (25) amperes. Moreover, if the LowestBypassCurrent is eleven (11)-amperes then: (a) NewOutput=(25−11)=14 amperes; (b) SwitchOutput=(INT(14/5)+1)=3; (c) BitPattern="00111"; and (d) LastOutput=(3*5)=15. Therefore, the Bit Pattern of "00111" would therefore cause three switching devices to energize, which would correspondingly provide only 15-amperes of charging current. Finally, in this example, if the LastOutput is fifteen (15) and the LowestBypassCurrent is thirteen (13)-amperes then: (a) NewOutput=(15−13)=2 amperes; (b) SwitchOutput=(INT(2/5)+1)=1; (c) BitPattern="00001"; and (d) LastOutput=(1*5)=5. Under these circumstances, the Bit Pattern "00001" would cause one (1) switching device to energize and thus provide only 5-amperes of charging current. Please note that the minimum available current that the charging source (the solar arrays) can provide under this scheme is equal to the value of one bit or one control line. Note, that this example clearly illustrates how such an algorithm and control could be affected and/or effectuated to achieve other functions and/or results. Moreover, a fully operational system could be implemented using other configurations, and, as an example, could be designed to manipulate the variable values under certain "stressed" conditions such as an over-discharged battery condition. And, while the above example illustrates the use of individual control lines from the Switch Output Controller/Function 60B, other ways of implementing control of the charging current RC (which, as previously mentioned, is preferably measurable at TP2) can also be used as well, for example a single Control Line 62 could be used to transmit a Matrix Programming signal MP, which could be measured and/or read at TP1 and which would cause the Switch Control Matrix 10B to make the appropriate adjustment to the charging current RC, as necessary.

Finally, it will be apparent to those skilled in the art of battery chargers (and/or other related fields) that many other modifications and/or substitutions can be made to the foregoing preferred embodiments without departing from the spirit and scope of the present invention. The preferred embodiments and the best mode of the present invention are described herein. However, it should be understood that the best mode for carrying out the invention herein described is by way of illustration and not by way of limitation. Therefore, it is intended that the scope of the present invention include all of the modifications that incorporate its principal design features.

What is claimed is:

1. A battery charging apparatus, said apparatus comprising:
   a programmable current source for providing a charging current to at least one rechargeable battery;
   a charging circuit in parallel electrical connection to said programmable current source, wherein said charging circuit: detects that said at least one rechargeable battery is in operational electrical communications with said battery charging apparatus; determines whether said charging circuit is actively charging said at least one rechargeable battery; and determines the magnitude of a bypass current bypassing said at least one rechargeable battery;
   a controller comprised of a power reduction algorithm for controlling the magnitude of said charging current provided by said programmable current source, wherein said controller is in electrical communication with said charging circuit and said programmable current source, and wherein said power reduction algorithm analyzes: (a) the magnitude of said charging current; (b) whether said charging circuit is actively charging said at least one rechargeable battery; and (c) the magnitude of said bypass current bypassing said at least one rechargeable battery; wherein, based on said power reduction algorithm analysis, said controller adjusts the magnitude of said charging current in response to changes in said bypass current; and
   at least one battery charging slot in electrical communication with said programmable current source, wherein each of said at least one battery charging slot is capable of operationally holding at least one of said at least one rechargeable battery and enabling each of said at least one rechargeable battery to receive said charging current from said programmable current source.

2. The battery charging apparatus of claim 1, wherein said current source is at least one solar cell.

3. The battery charging apparatus of claim 1, wherein said current source is at least one solar array.

* * * * *